United States Patent
Yi et al.

(10) Patent No.: US 8,097,226 B2
(45) Date of Patent: Jan. 17, 2012

(54) CATALYTIC REACTION DEVICE

(75) Inventors: Jiangping Yi, ZheJiang (CN); Li Huang, Hunan (CN); Wensheng Li, Hunan (CN); Xio Ping Zhou, Huan (CN)

(73) Assignee: Microvast Power Systems Co., Ltd., Huzhou (CN)

( * ) Notice: Subject to any disclaimer, the term of this patent is extended or adjusted under 35 U.S.C. 154(b) by 683 days.

(21) Appl. No.: 12/097,684

(22) PCT Filed: Dec. 13, 2006

(86) PCT No.: PCT/CN2006/003391
§ 371 (c)(1),
(2), (4) Date: Aug. 14, 2008

(87) PCT Pub. No.: WO2007/068203
PCT Pub. Date: Jun. 21, 2007

(65) Prior Publication Data
US 2009/0269258 A1    Oct. 29, 2009

(30) Foreign Application Priority Data

Dec. 14, 2005  (CN) .......................... 2005 1 0032548

(51) Int. Cl.
*B01J 8/00* (2006.01)
*B01J 8/02* (2006.01)
*B01J 8/04* (2006.01)
*B01J 8/06* (2006.01)
*B01J 19/00* (2006.01)
*B01J 35/02* (2006.01)

(52) U.S. Cl. ........ 422/650; 422/129; 422/130; 422/131; 422/600; 422/603; 422/607; 422/630; 422/641; 422/642; 422/643; 422/644; 422/646; 422/649; 422/651; 422/653; 422/654; 422/655; 422/656; 422/657; 422/659

(58) Field of Classification Search ................... 422/600, 422/129–131, 601, 603, 607, 630, 641–644, 422/464, 649–659
See application file for complete search history.

(56) References Cited

U.S. PATENT DOCUMENTS

| 5,455,014 | A | * | 10/1995 | Costantino et al. ........... 422/305 |
| 6,808,689 | B1 | | 10/2004 | Matsumoto et al. |
| 2002/0048536 | A1 | * | 4/2002 | Bergh et al. ................... 422/130 |
| 2002/0182128 | A1 | * | 12/2002 | Carnahan et al. .............. 422/188 |
| 2003/0175183 | A1 | * | 9/2003 | Guetlhuber .................... 422/196 |
| 2005/0031491 | A1 | | 2/2005 | Corma Canos et al. |

FOREIGN PATENT DOCUMENTS

| CN | 1096877 C | * | 12/2002 |
| CN | 1643383 A | * | 7/2005 |
| DE | 29719919 U1 | * | 4/1999 |

OTHER PUBLICATIONS

English astract of DE 29719919 U1, which was published Apr. 1, 1999.*

* cited by examiner

*Primary Examiner* — Walter Griffin
*Assistant Examiner* — Natasha Young
(74) *Attorney, Agent, or Firm* — Baker & McKenzie LLP

(57) ABSTRACT

A catalytic reaction device for fluid-solid heterogeneous catalytic reactions including a distributor, flow controllers, parallel reactors, temperature controllers, coolers and product receivers with reactive fluids flowing into the flow controllers to control the total flow of a fluid is provided.

3 Claims, 2 Drawing Sheets

CATALYTIC REACTION DEVICE

CROSS REFERENCE TO RELATED APPLICATIONS

This application is a National Stage Entry of PCT Application No. PCT/CN2006/003391, filed Dec. 13, 2006, which claims priority to Chinese Application No. 200510032548.5, filed Dec. 14, 2005.

FEDERALLY SPONSORED RESEARCH

Not applicable.

REFERENCE TO MICROFICHE APPENDIX

Not applicable.

FIELD OF THE INVENTION

This invention relates to a universal distributor and a high throughput parallel fluid-solid heterogeneous catalytic reaction device.

BACKGROUND OF THE INVENTION

Combinatorial chemistry holds the promise to significantly accelerate the pace of synthesizing hundreds and thousands of samples in different chemical composition, and the chemical properties of many samples and their reaction conditions are also measured and optimized simultaneously. At present, the success rate of combinatorial chemistry research in the field of catalysis mainly depends on the strength or weakness of overall reaction system design.

The development of combinatorial chemistry in the catalysis field is more challenging than in other fields, such as the superconductor, electromagnetics, and fluorescence material fields, mainly because: 1) the flow controller system of the reactor must ensure that the difference of the fluid flow rate in different channels is in an acceptable range (this problem does not exist in a batch reactor); 2) the reactor must be kept sealed under high temperature and pressure; 3) the temperature of catalysts in different reaction channels must be kept consistent.

Although the chamber-type reactor designed by Moates' group [Ind. Eng. Chem. Res. 1996, 35, 4801] achieved simultaneous reaction for a catalyst library, the testing data gathered by this reactor design didn't represent the real catalysts' properties. In this reactor design, the reactant drifted on the catalyst with poor flowing mode. Moreover, the reactant and product coexisted in the same chamber so they diffused into each other. Therefore, the results didn't reflect the real catalyst properties.

Jochen Lauterbach's group reported a catalytic combinatorial chemical reaction and detection system [J. Comb. Chem., 2000, 2, 243; Catalysis Today, 2001, 67, 357] in which they combined 16 fixed-bed reactors in parallel to form a combinatorial reactor. This publication didn't mention how the 16 channels of reactant gas were controlled.

The catalytic combinatorial reaction system designed by Senkan's group, which could test and evaluate the catalysts library, was actually a parallel reaction and detection system. Since this system didn't include a fluid distributor, the tiny back pressure difference in different catalyst channels would result in the differences of the fluid reactant flow. This produced a large relative error of the testing data and results.

Symyx Technologies Inc. developed a Catalysis Scanning Mass Spectroscopy (CSMS) system. In this system, a catalyst library was prepared on quartz glass, and a $CO_2$ laser was used to heat individual catalysts in the library by heating specific locations on the back side of the quartz glass. An infrared ("IR") temperature sensor was used to monitor the temperature of a specific catalyst. Concentric tubes were placed on the top of catalyst library and acted as reactant gas and product gas flow tube. The reactant gas passed through the inner tube and reacted with a catalyst surface and then passed out of the inner tube, and then the outer tube absorbed product gas and transferred the product gas to mass spectrometry for analysis. The process was accomplished in approximately 1 minute and only one catalyst was evaluated [Angew. Chem. 1999, 111, 508; Appl. 1998, WO-A98/15969]. This system was a traditional sequential analysis technology and couldn't be used for liquid reactions, so it didn't fulfill the requirement of high-throughput and parallel reaction mode. Moreover, heterogeneous catalysts generally need to be stabilized in the reaction environment for several hours before reaction takes place in order to produce reliable data on catalyst conversion and selectivity. Since a catalyst was only evaluated in a few minutes in this CSMS system, the data collected was not reliable. Also, the drifting flow mode on the quartz glass was very different from the fluid flow mode in a fixed-bed micro reactor.

SUMMARY OF THE INVENTION

According to one aspect of the current invention, the catalytic reaction device comprises a distributor, flow controller, multi-channel parallel reactor, temperature controller, cooler, and product receiver.

According to another aspect of the current invention, the distributor distributes one stream into many streams and the flow rate of each stream is adjusted independently.

According to another aspect of the current invention, the distributor comprises a top plate, a compartment, a bottom plate, a fluid tube, and a fastening seal part.

According to another aspect of the current invention, the compartment comprises an M×N flow channels array where M and N are integers.

According to another aspect of the current invention, the individual flow channel has an adjusting system that comprises a screw rod, a pushing tube, porous discs, and elastic balls.

According to another aspect of the current invention, the multi-channel parallel reactor comprises a multi-channel top connector, a reaction tube, a heating block, a stand, a cooler, and a product receiver.

According to another aspect of the current invention, the multi-channel top connector comprises a cover plate, a multi-channel joint plate, a multi-channel seal plate, fastening screw, and seal cushion. The multi-channel top connector joins the fluid tubes array and the reaction tubes array.

According to another aspect of the current invention, the heating block has an M×N holes array for settling reaction tubes. There are also other holes for settling heating rod and temperature sensor.

According to another aspect of the current invention, the cooler comprises seal plate, cooling plate, and seal cushion. There is an M×N holes array on the said cooling plate for settling reaction tubes. There are also other channels in the said cooling plate for the circulation of cooling media.

According to another aspect of the current invention, the product receiver has an M×N small vessels array for collecting products.

DETAILED DESCRIPTION OF THE INVENTION AND EXAMPLE

The following description illustrates embodiments of the current invention by way of example and not by way of limitation. Thus, the embodiments described below represent preferred embodiments of the current invention.

Some embodiments of the invention provide a universal fluid distributor and a high-throughput parallel catalytic reaction device. A few different types of reactant fluids are distributed through several distributors. The fluid reactants are further mixed in different ratios depending upon the experimental design in which the device is used, and mixed reactants enter into the corresponding channels in parallel catalytic reactors to undertake independent catalytic reaction. The current invention accelerates the pace of screening new catalysts and optimizing process conditions significantly.

According to another aspect of the current invention, the distributor is a universal distributor and can be used as a multi-channels fluid distribution device independently.

Figure 1:
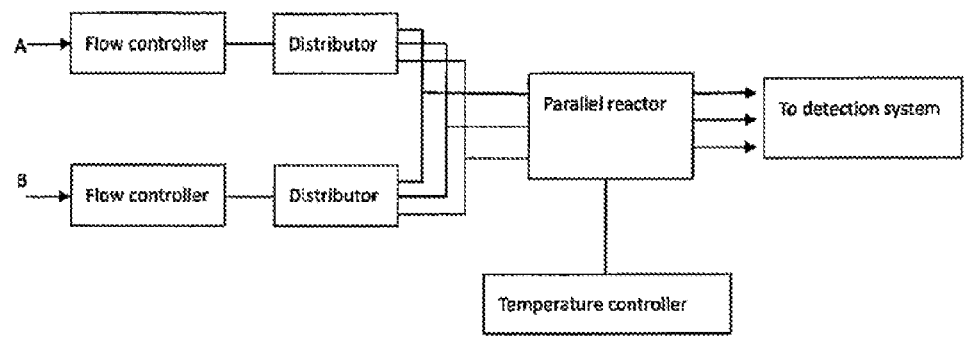
FIG. 1 is a schematic of the fluid-solid heterogeneous combinatorial catalytic reaction device of the current invention.

According to another aspect of the invention, the high-throughput catalytic reaction device comprises flow controllers, distributor, multi-channel parallel reactor, temperature controller, cooler, and product receiver as shown in FIG. 1. In this specific embodiment, the cooler and product receiver are integrated in the multi-channel parallel reactor.

According to another aspect of this invention, the distributor distributes one reactant stream into many streams and the flow rate of each stream is adjusted independently.

According to another aspect of the invention, the distributor's working principle is to change the flow resistance and adjust the void ratio of the elastic packing material in the fluid flow channel. Not only a uniform flow rate for individual flow channel is reached, but also a different flow rate in different flow channels can be accomplished according to experimental needs. This distributor thus solves the challenge of fluid distribution in combinatorial chemistry field for multi-channel purpose.

According to another aspect of the current invention, the distributor is not limited to use in this catalytic reaction device, and it is also suitable for multi-channel flow distribution purpose in many fields.

Figure 2:
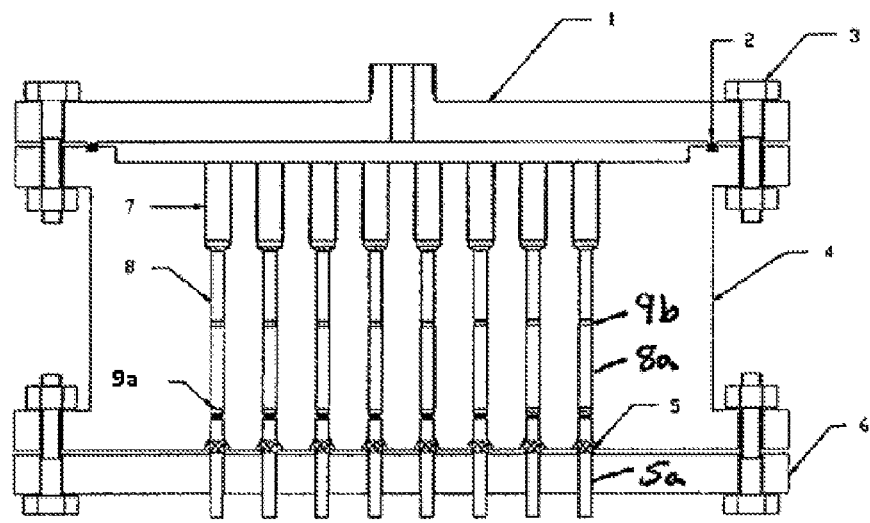
FIG. 2 is a schematic the universal distributor of the current invention.

According to another aspect of the invention, the distributor as shown FIG. 2 comprises top plate 1, compartment 4, bottom plate 6, and seal ring 2. On the top of the compartment 4, there is a circular groove (not shown) where seal ring 2 is mounted. The top plate 1 and the compartment 4 are connected by screw 3 and sealed by the seal ring 2. There are M×N flow channels 8a distributed uniformly in the compartment 4, in each flow channel an adjusting system is mounted. At the bottom of each flow channel 8a, a porous disc 9a is placed. Above the porous disc 9a, many elastic balls fill the flow channel 8a and then another porous disc 9b is placed above the elastics ball filled channel. Above the upper porous disc 9b, a pushing tube 8 is placed. Above the pushing tube 8, there is an adjustable screw rod 7. The flow rate in each individual channel 8a is adjusted by turning the screw rod 7. The screw rod 7 pushes the pushing tube 8 to drive the top porous disc 9b downward to compress the elastic balls to adjust the void ratio of the elastic packing material in the fluid flow channel 8a, thus the reactant fluid flow resistance is changed and the flow rate is controlled accordingly. The reactant fluid exits the compartment 4 by flowing through exit tubes 5a that are mounted on the bottom of the compartment 4 and penetrate the bottom plate 6. Each fluid exit tube 5a is connected with the end of an individual flow channel 8a, and elastic seal part 5 is employed between the fluid exit tube 5a and the bottom plate 6.

According to another aspect of the current invention, the reactant fluid streams from different reactant storage tanks, pass flow controllers and then enter into distributors. Different types of distributed reactant fluids are further mixed in different ratios depending upon the experimental design in which the device is used. The mixed reactants enter into their corresponding channels in parallel catalytic reactors to undertake independent catalytic reactions.

Figure 3:
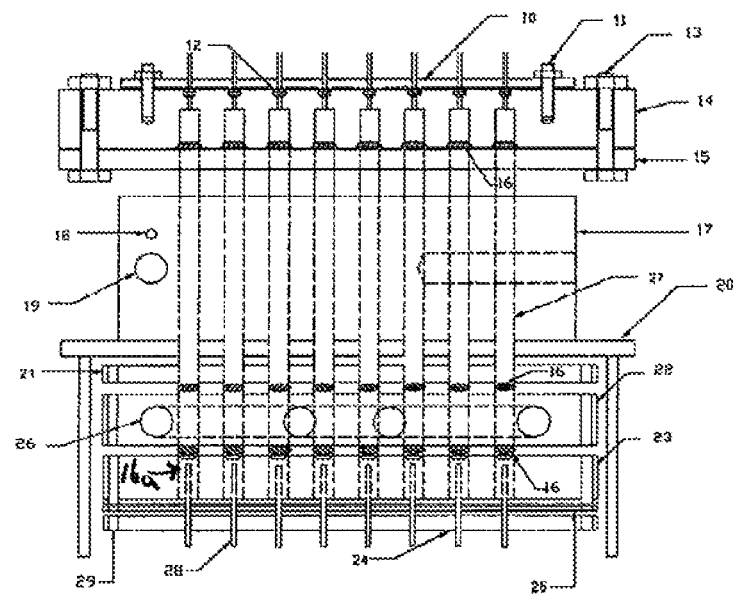
FIG. 3 is a schematic of the high-throughput reactor of the current invention.

According to another aspect of the invention, the multi-channel parallel reactor as shown in FIG. 3 comprises multi-channel top connector, reaction tubes, heating block, stand, cooler, and product receiver. The multi-channel top connector comprises cover plate 10, multi-channel joint plate 14, multi-channel seal plate 15, fastening screws 11 and 13, and seal cushions 12. The function of the multi-channel top connector is to join and seal the fluid exit tubes from the distributor and the reaction tubes 27. There is an M×N holes array on the heating block 17, and M×N reaction tubes 27 penetrate through the M×N holes inside of the heating block 17. Temperature sensors and heating rods are respectively mounted in hole 18 and hole 19 of heating block 17 and connected to a temperature controller (not shown) to regulate and maintain a desired temperature in the catalyst beds in reaction tubes 27. Heating block 17 is supported by stand 20. The fluid reactants pass into the reaction tubes in which the fluid reactants are exposed to the catalysts at stable, well maintained temperatures, permitting a variety of catalysts to be tested at uniform temperatures and conditions. The fluids including un-reacted reactant fluids and reaction products continue to flow downward into the cooling zone where products with high boiling points are condensed and collected by individual small vessels held within the product receiver 23. The cooler mainly comprises seal plate 21, cooling plate 22, and seal cushion 16. There is an M×N holes array on seal plate 21 and cooling plate 22 through which reaction tubes 27 penetrate. The seal cushion 16 is used between reaction tubes 27 and cooling plate 22. There are several cooling channels 26 on the cooling plate 22 that are used to maintain and regulate the temperature of cooling plate 22 and consequently, that part of the reaction tubes 27 that penetrate cooling plate 22. The cooling channels 26 may be a traditional cooling circulation system, such as a chilled water circulation system. An M×N small vessels array 16a is mounted on the product receiver 23 for collecting the liquid products condensed in the reaction tubes 27 as the reaction products and un-reacted reactant fluids pass through the cooling zone. The uncondensed gasses exit reaction tubes 27 through exhaust gas tubes 28. Exhaust gas tubes 28 penetrate through an M×N holes array on base plate 24 and seal plate 25. Exhausted gas tubes 28 and product receiver 23 are separated by seal plate 25. The seal plate 21, cooling plate 22, product receiver 23, base plate 24, and seal plate 25 are tightly fastened and sealed through screw rods mounted in the screw holes 29.

According to another aspect of the current invention, insulation layers are used in the gap between multi-channel top connector and array heating plate, or in the gap between heating block and cooler, or around the exterior wall of heating block.

Example 1

Screening of Catalyst to Synthesize Propenal by Propane Oxidation

Figure 4:
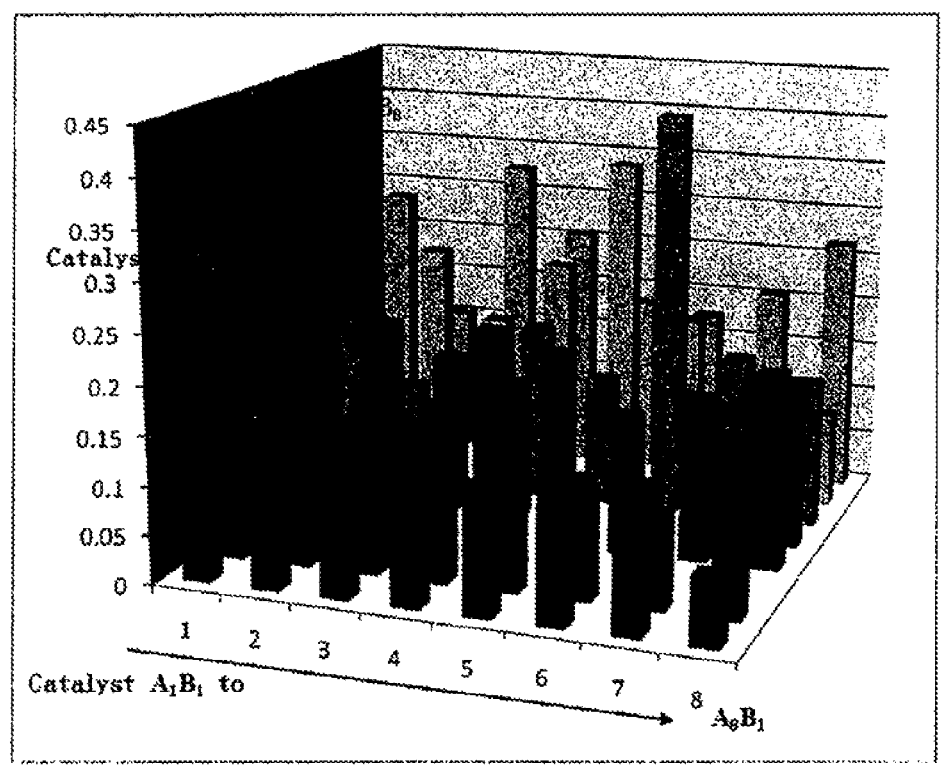
FIG. 4 is the mole concentration of propenal solution prepared over different catalysts.

The system set up is illustrated as shown in FIG. 1 using an 8×8 array of flow channels. Propane and oxygen were introduced into separate distributors after exiting from separate flow controllers respectively. The reactant gasses were then distributed into 64 flows by adjusting the screw rods in each distributor. The oxygen flow from the outlet of the oxygen distributor is shown in Table 1 and the difference of flow rate among channels is in a very reasonable range. The propane flow rate is half of the oxygen flow rate. The 64 streams of combined oxygen and propane were each mixed and then sent into parallel reactor through a 64 channel connector. The mixed reactant gasses passed through the reaction tubes in which catalysts $A_iB_j$ were settled. Reactions occurred at catalyst beds after heating them to 400□. The propenal product were cooled and collected in the product receiver in liquid phase, then they were sent to a high-throughput parallel detection system to carry out further analysis (these technologies were described in other patent applications: High-throughput Spectral Imaging and Spectroscopy Apparatus and Methods, U.S. patent application Ser. No. 12/105,676. Combinatorial Chemistry Spectrophotometer Detection System, Chinese patent application #: 200510031800.0). The results showed the effectiveness of different catalysts in synthesizing propenal from propane oxidation process in FIG. 4, and demonstrate excellent experiment reproducibility.

TABLE 1

| Oxygen Stream (ml/min) | 8 × 8 Array Oxygen Stream Flow Distribution |||||||||
|---|---|---|---|---|---|---|---|---|
| | 1 | 2 | 3 | 4 | 5 | 6 | 7 | 8 |
| 1 | 2.19 | 2.17 | 2.23 | 2.24 | 2.20 | 2.20 | 2.23 | 2.23 |
| 2 | 2.16 | 2.21 | 2.23 | 2.25 | 2.25 | 2.26 | 2.26 | 2.23 |
| 3 | 2.18 | 2.18 | 2.20 | 2.21 | 2.24 | 2.27 | 2.24 | 2.27 |
| 4 | 2.20 | 2.23 | 2.24 | 2.24 | 2.16 | 2.26 | 2.26 | 2.21 |
| 5 | 2.21 | 2.17 | 2.16 | 2.23 | 2.21 | 2.26 | 2.21 | 2.23 |
| 6 | 2.21 | 2.26 | 2.13 | 2.23 | 2.23 | 2.25 | 2.25 | 2.23 |
| 7 | 2.18 | 2.22 | 2.25 | 2.19 | 2.27 | 2.18 | 2.23 | 2.24 |
| 8 | 2.19 | 2.21 | 2.15 | 2.24 | 2.23 | 2.26 | 2.19 | 2.20 |

What is claimed:

1. A catalytic reaction device comprising a flow controller for accepting a reactant fluid, a distributor fluidly connected to the flow controller, a multi-channel parallel reactor fluidly connected to the distributor, a temperature controller for controlling the temperature of the parallel reactor, a cooler fluidly connected to the parallel reactor, and a product receiver fluidly connected to the cooler, wherein the distributor separates a reactant stream into a plurality of reactant streams and wherein the flow rate of each of the plurality of reactant streams is independently controlled, wherein the distributor comprises a plurality of fluid tubes within a compartment bounded by removable top and bottom plates.

2. The catalytic reaction device of claim 1, wherein the plurality of fluid tubes comprises a M×N flow channels wherein M and N are integers.

3. The catalytic reaction device of claim 2, wherein each flow channel has an adjusting system which comprises a screw rod fluidly connected to a pushing tube and a lower tube fluidly connected to the pushing tube and filled with elastic balls.

* * * * *